US007714691B2

(12) United States Patent
Zhu et al.

(10) Patent No.: US 7,714,691 B2
(45) Date of Patent: May 11, 2010

(54) VERSATILE SYSTEM FOR A LOCKING ELECTRO-THERMAL ACTUATED MEMS SWITCH

(75) Inventors: Xu Zhu, Allen, TX (US); Michael L. Brobston, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 899 days.

(21) Appl. No.: 11/325,936

(22) Filed: Jan. 5, 2006

(65) Prior Publication Data

US 2006/0221430 A1 Oct. 5, 2006

Related U.S. Application Data

(60) Provisional application No. 60/668,522, filed on Apr. 5, 2005.

(51) Int. Cl.
*H01H 61/00* (2006.01)
*H02N 10/00* (2006.01)

(52) U.S. Cl. .................. 337/14; 337/2; 337/3; 337/53; 257/415; 335/78; 335/80; 335/141; 335/144; 200/181; 310/307

(58) Field of Classification Search ................ 257/415; 337/2, 3, 14, 53; 335/78, 80, 141, 144; 200/181; 310/307
See application file for complete search history.

(56) References Cited

U.S. PATENT DOCUMENTS

| | | | | |
|---|---|---|---|---|
| 6,549,107 | B2 * | 4/2003 | Lim et al. | 335/78 |
| 6,804,036 | B1 * | 10/2004 | Chen et al. | 359/237 |
| 6,806,991 | B1 * | 10/2004 | Sarkar et al. | 359/290 |
| 2002/0163709 | A1 * | 11/2002 | Mirza | 359/295 |
| 2007/0188846 | A1 * | 8/2007 | Slicker et al. | 359/290 |

* cited by examiner

*Primary Examiner*—Evelyn A. Lester

(57) ABSTRACT

A lockable MEMS switching architecture provided having a clutch assembly, a switching member, and an actuator. The clutch assembly has one or more engagement features located in proximity to the switching member—particularly one or more receiving features located upon the switching member. The clutch assembly is actuated to disengage the engagement features from the receiving features. The switching member is actuated to move in relation to the clutch assembly. Once the switching member is in a desired position, the clutch assembly is de-actuated, causing the engagement features to re-engage with the switching member, thereby restricting its further movement.

20 Claims, 8 Drawing Sheets

VERSATILE SYSTEM FOR A LOCKING ELECTRO-THERMAL ACTUATED MEMS SWITCH

CROSS-REFERENCE TO RELATED APPLICATION AND CLAIM OF PRIORITY

The present application is related to U.S. Provisional Patent No. 60/668,522, filed Apr. 5, 2005, entitled "Electro-Thermal Actuated RF-MEMS Switch with Mechanical Latch". U.S. Provisional Patent No. 60/668,522 is assigned to the assignee of the present application and is hereby incorporated by reference into the present disclosure as if fully set forth herein. The present application hereby claims priority under 35 U.S.C. §119(e) to U.S. Provisional Patent No. 60/668,522.

TECHNICAL FIELD OF THE INVENTION

The present application relates generally to the fields of micro-electromechanical systems (MEMS) and wireless telecommunication technologies, and more particularly, to a versatile system for passively restricting the movement of certain MEMS switch structures.

BACKGROUND OF THE INVENTION

The continual demand for enhanced speed, capacity and efficiency has resulted in dramatic advances in a variety of manufacturing fields (e.g., electronics, communications, and machinery). Among many recent developments, the field of electro-mechanics has focused significant attention on the miniaturization of various devices. A micro-electromechanical system (MEMS) is a system that usually has electrically controllable micro-machines (such as a motor, actuator, optical modulating element, etc.)—most often formed monolithically on a semiconductor substrate using integrated circuit techniques.

Several micro-actuator technologies have been investigated for positioning individual elements in MEMS applications. Electrostatic, magneto-static, piezoelectric and thermal-expansion systems have been used in varying degrees for micro-actuator operation. From this field of technology, asymmetric electro-thermal actuators have proven particularly useful in a number of MEMS applications.

Generally, a MEMS polysilicon surface micromachined electro-thermal actuator uses differential heating to generate thermal expansion and movement. In one conventional asymmetric electro-thermal actuator design, a single "hot arm" is narrower than a "cold arm." When electric current is applied, the electrical resistance of the hot arm is greater. When an electrical current passes through both the hot and cold arms, the hot arm is heated to a higher temperature than the cold arm. This temperature differential causes the hot arm to expand along its length, thus forcing the tip of the actuator to rotate about the flexure. Another variant of the asymmetric design joins together arms of similar size and shape, but having substantially different coefficients of thermal expansion. In such design, a "hot arm" has a higher coefficient of thermal expansion than that of a "cold arm." When electric current passes through both the hot and cold arms, the hot arm expands more than the cold arm, effecting the desired actuator movement.

Frequently, electro-thermal actuators are deployed as bi-stable switches—i.e., as elements that switch between a first position, when no current is applied, and a second position, when current is applied. Once the current is removed, the actuator returns to its initial position.

Such MEMS components may be utilized in a wide variety of electrical or mechanical switching applications. Application of MEMS-scale switches may be of particular use in the wireless communications field; especially as portable wireless communication devices continue to strive for greater performance from devices of decreasing form factor.

There are a number of potential switching applications in wireless communication products that could benefit from MEMS-scale components. Consider, for example, a multi-mode cell phone. It would be advantageous, from a size and form factor perspective, to use a MEMS switch to shift operation between modes. In these and other small, battery-powered wireless communications devices, however, power consumption must be also minimized in order to extend time of operation on a battery charge. As such, a conventional MEMS-scale switch component may be of limited utility in such devices—since such switches often return to a default position in the absence of power. Another consideration is that a number of applications may require a multi-position switch, having more than just two positions or states. Implementing such applications using only bi-stable MEMS switches would either be cumbersome or infeasible.

Furthermore, even where a conventional bi-stable MEMS switch may be suitable, the direct interface between semiconductor circuitry and operational MEMS structures can still cause operational problems. For example, operation may require deployment of a conventional MEMS switch while a second, adjacent operational element is electrostatically actuated. Given the minute scale of such structures and the separations therebetween, the electrostatic signals actuating the second element could adversely affect the MEMS switch, leading to a malfunction or performance loss. Brute force solutions, such as complex routing layouts, might be employed to overcome such a problem, but they also introduce a number of inefficiencies to device manufacturing or operation.

As a result, there is a need for a system that provides reliable and sustainable MEMS switching, without relying on continuous electrostatic or electromagnetic force—one that is readily adaptable to a number of production or manufacturing processes, and to address a variety of specific design requirements, including the provision of multi-throw switches—while providing reliable device performance in an easy, efficient and cost-effective manner.

SUMMARY OF THE INVENTION

A versatile system, comprising various apparatus and methods, is provided for reliable passive restriction of MEMS switching structures. The system restricts MEMS switch structure movement without relying on continuous electrostatic or electromagnetic forces. The system is readily and easily adaptable to a number of device applications, design requirements, and production or manufacturing processes—efficiently providing single or multi-throw switches. The system further obviates unintended MEMS movements due to incidental forces—electrostatic and otherwise—and thus provides reliable device performance in an easy, efficient and cost-effective manner.

Specifically, the system provides a "lockable" MEMS switching architecture that is readily fabricated within a variety of semiconductor technologies. The locking MEMS switch is fabricated such that, once device production is completed, a clutch assembly having one or more engagement features is disposed in proximity to a switching member having one or more receiving features. Electrostatic or thermal expansion force may be applied the clutch assembly to disengage the engagement features from the receiving features, and to the switching member to move it in relation to the clutch assembly. Once the switching member is in a desired position, the electrostatic or thermal expansion force may be removed from the clutch assembly, causing the engagement features to re-engage with the switching member, thereby restricting its further movement. Electrostatic or thermal expansion force may then be removed from the switching member.

More specifically, a MEMS device is provided. The MEMS device comprises a switching member, and a first actuator coupled to a first portion of the switching member. A switching element is coupled to a second portion of the switching member, opposite the first actuator. An engagement feature is disposed along the switching member between the first actuator and the switching element. A first contact element is disposed along a surface of the switching element. A clutch assembly is provided, having an engagement element formed in proximity to the engagement feature. The engagement element is adapted to operably engage with the engagement feature. A second contact element is formed in proximity to the first contact element, and adapted to form contact with the first contact element when the switching member is actuated or, alternatively, when the switching member is not actuated.

In other embodiments, a method for lockably switching a MEMS switch device provides a switching member having a plurality of engagement features disposed along its surface. A first actuator is coupled to a first portion of the switching member. A clutch assembly is provided, having an engagement element formed in proximity to, and adapted to operably engage with, the engagement features. The clutch assembly is provided with a second actuator adapted to engage or disengage the engagement element from the engagement features. The second actuator is operated to disengage the engagement element from a first engagement feature. The first actuator is operated to move the switching element relative to the engagement element. The second actuator is de-actuated, engaging the engagement element with a second engagement feature of the switching member.

In still other embodiments, a wireless communications device comprises an antenna input, a plurality of antenna structures, and a switching member adapted to selectively couple the antenna input to one of the plurality of antenna structures. A first actuator is coupled to the switching member, and adapted to switch a first contact on the switching member in or out of engagement with a second contact, associated with a desired one of the plurality of antenna structures. A clutch assembly is adapted to passively engage with the switching member to prohibit movement thereof, and to actuatably disengage from the switching member, to allow switching thereof.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged MEMS switching structure, or any other MEMS structure in which passive physical restriction of a movable component is desired.

The following disclosure provides a versatile system, comprising various architectures, apparatus and methods for reliable passive restriction of MEMS switching structures. The system is operable by electrostatic, electromagnetic or thermal expansion forces, but passively restricts MEMS switch structure movement in the absence of continuous electrostatic, electromagnetic or thermal expansion forces. The system is readily and easily adaptable to a number of device applications, design requirements, and production or manufacturing processes. The system may be implemented to efficiently provide a simple bi-stable switch, or extensive multi-throw switches. The system obviates unintended MEMS movements due to incidental collateral forces—electrostatic and otherwise—that may occur near or around a switch of concern during device operation.

Specifically, this system provides a "lockable" MEMS switching architecture that is readily fabricated within a wide variety of semiconductor technologies. The locking MEMS switch is fabricated such that, once device production is completed, a clutch assembly having one or more engagement features is disposed in proximity to a switching member having one or more receiving features. Electrostatic or thermal expansion force may be applied the clutch assembly to disengage the engagement features from the receiving features, and to the switching member to move it in relation to the clutch assembly. Once the switching member is in a desired position, the electrostatic or thermal expansion force may be removed from the clutch assembly, causing the engagement features to re-engage with the switching member, thereby restricting its further movement. Electrostatic or thermal expansion force may then be removed from the switching member.

Figure 1A:
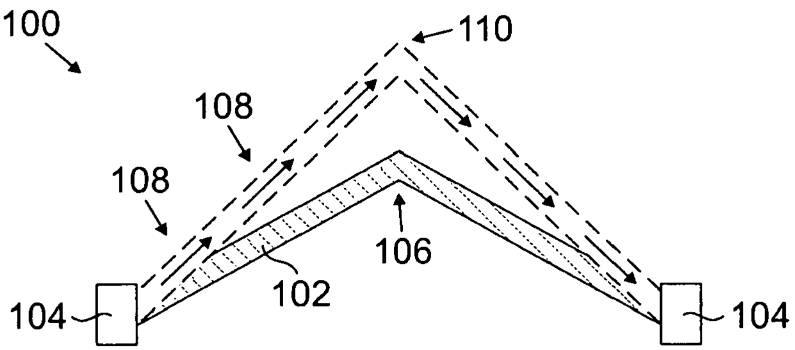
FIGS. 1*a*-1*c* illustrate various embodiments of electro-thermal actuating assemblies.
Figure 1B:
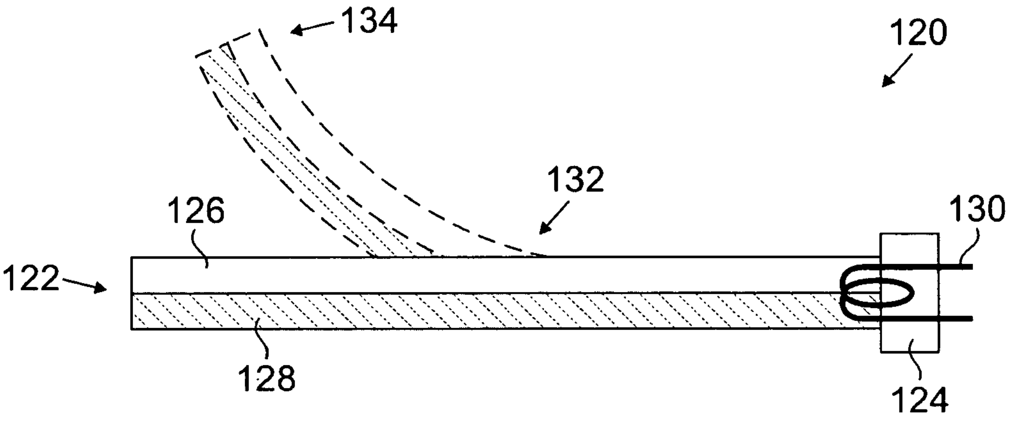
Figure 1C:
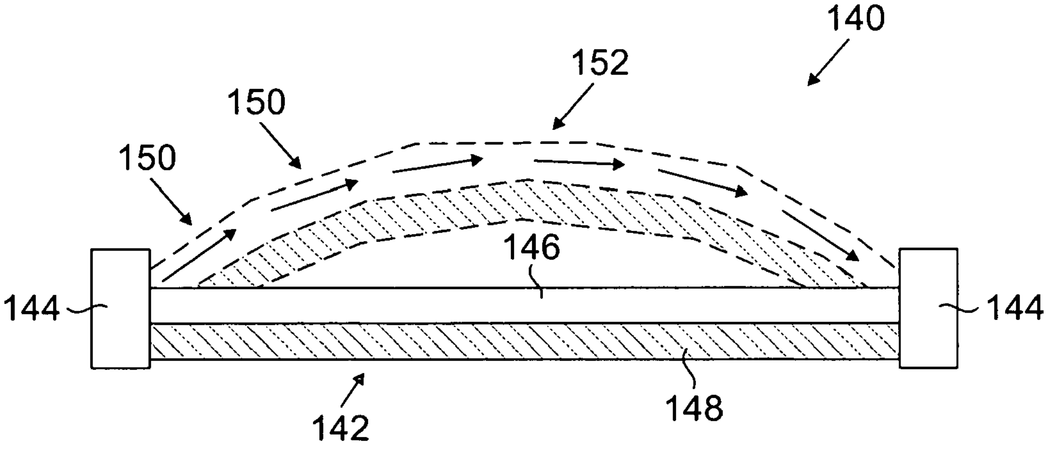

For purposes of explanation and illustration, several variations of electro-thermal actuators are depicted and described in relation to FIGS. 1*a*-1*c*. In FIG. 1*a*, a basic bent-beam type actuator assembly 100 is depicted in a top-down view. Assembly 100 comprises an electrically conductive actuating member 102 anchored between two fixed anchor members 104. Member 102 is formed having a bend or joint feature 106 somewhere along its span. Current 108 is passed through member 102, causing member 102 to heat and expand. Anchors 104 prohibit member 102 from expanding laterally, so member 102 is constrained to expand orthogonally. Member 102 is fabricated of a semi-rigid material (e.g., aluminum, copper) that is nonetheless flexible enough to accommodate additional bending at feature 106. Once the expansion of member 102 is stabilized, it is left in an actuated position 110. Current may then be removed from member 102, allowing it to cool, condense, and return to its original position.

In FIG. 1*b*, a composite cantilever type actuator assembly 120 is depicted in a top-down view. Assembly 120 comprises a composite beam 122 anchored at one end to a fixed anchor member 124. Beam 122 comprises two layers 126 and 128. Layer 126 comprises a material having a lower coefficient of thermal expansion than the material that comprises layer 128. A conductive or heating element 130 is disposed at anchor 124, in contact with or proximity to layers 126 and 128. Element 130 is heated, causing layers 126 and 128 to heat and expand. Layers 126 and 128 expand at different rates, or by different amounts, however, causing a cant or bend 132 in beam 122. This results in beam 122 shifting to an actuated position 134. Once heating of element 130 is discontinued, layers 126 and 128 cool, condense, and return beam 122 to its original position.

In FIG. 1*c*, a buckle beam type actuator assembly 140 is depicted in a top-down view. Assembly 140 comprises a composite beam 142 anchored between two fixed anchor members 144. Beam 142 comprises two layers 146 and 148. Layer 146 comprises a material having a higher coefficient of thermal expansion than the material that comprises layer 148. Current 150 is passed through member 142, causing layers 146 and 148 to heat and expand. Layers 146 and 148 expand at different rates, or by different amounts, and anchors 144 prohibit member 142 from expanding laterally. Member 142 thus expands, or buckles, orthogonally until it shifts to an actuated position 152. Current may then be removed from member 142, causing layers 146 and 148 to cool and condense, and return beam 142 to its original position.

Figure 2A:
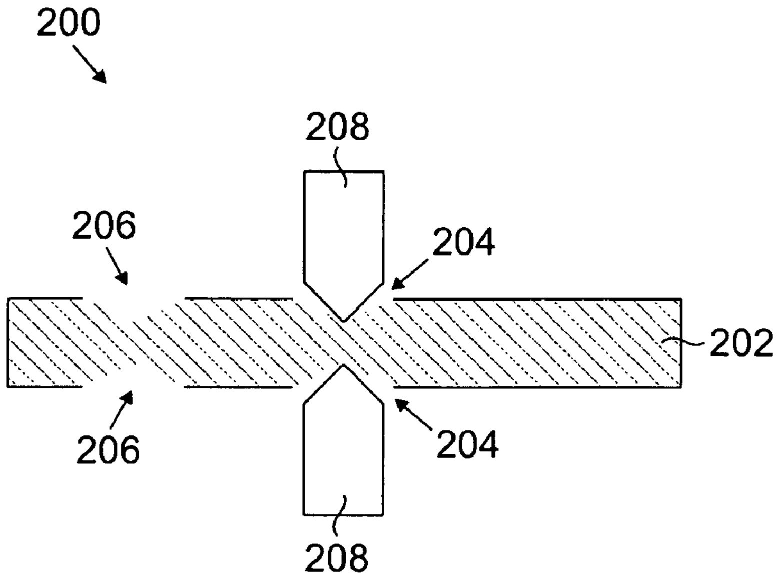
FIGS. 2*a*-2*d* illustrate the operation of one embodiment of a clutch assembly in accordance with the present disclosure.

Certain aspects and embodiments of the system of the present disclosure are now depicted and described in relation to FIGS. 2*a*-2*d*. In FIG. 2*a*, a clutch assembly 200 having tooth or pinion type engagement elements is depicted in a top-down view. Assembly 200 comprises a switching element 202 that a first set of engagement features 204, corresponding to a first position, and a second set of engagement features 206, corresponding to a second position. As depicted in FIGS. 2*a*-2*d*, features 204 and 206 are depicted as notches, trenches or indentations formed into a surface of member 202. In alternative embodiments, however, features 204 or 206 may comprise any other suitable constructs—such as protuberances, teeth, or tabs extending outwardly from a surface of element 202. Assembly 200 also comprises a clutch assembly having tooth or bearing type engagement elements 208 disposed or formed in proximity to member 202. Elements 208 may be coupled to, formed as part of, or otherwise controlled by any suitable electro-thermal actuating assembly (not shown). Similarly, element 202 may be coupled to, formed as part of, or otherwise controlled by another suitable electro-thermal actuating assembly (not shown).

Figure 2B:
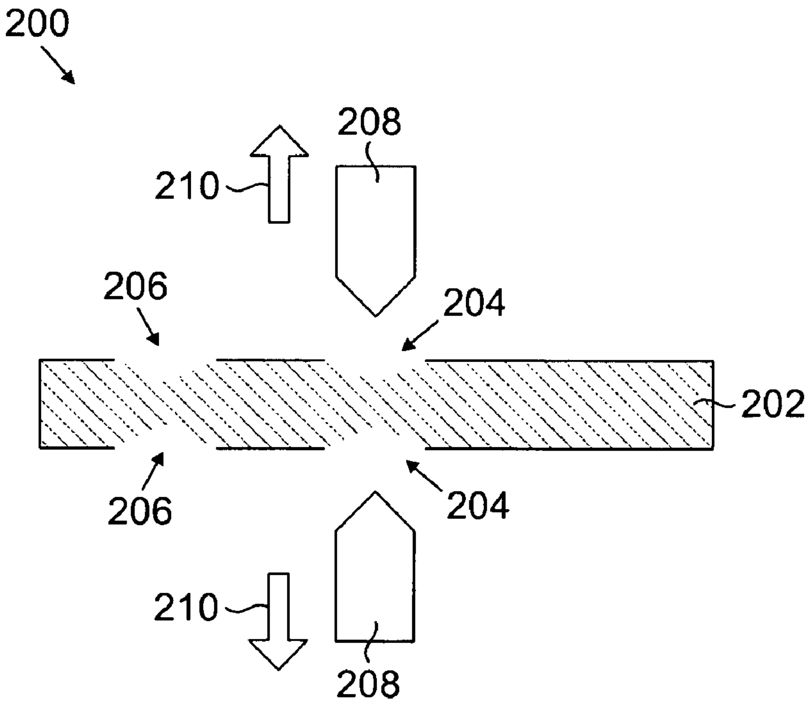
Figure 2C:
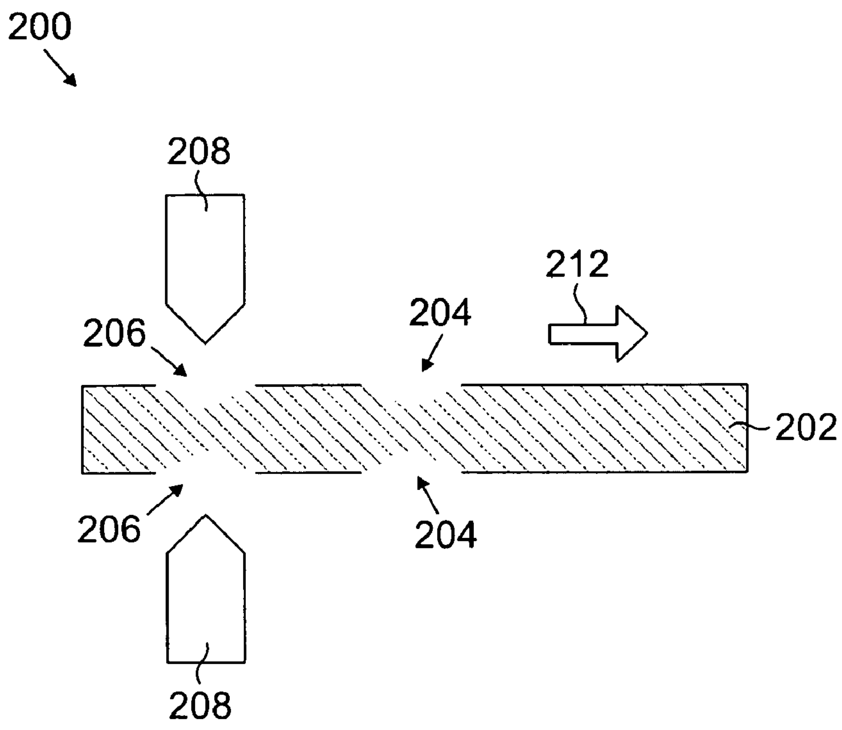
Figure 2D:
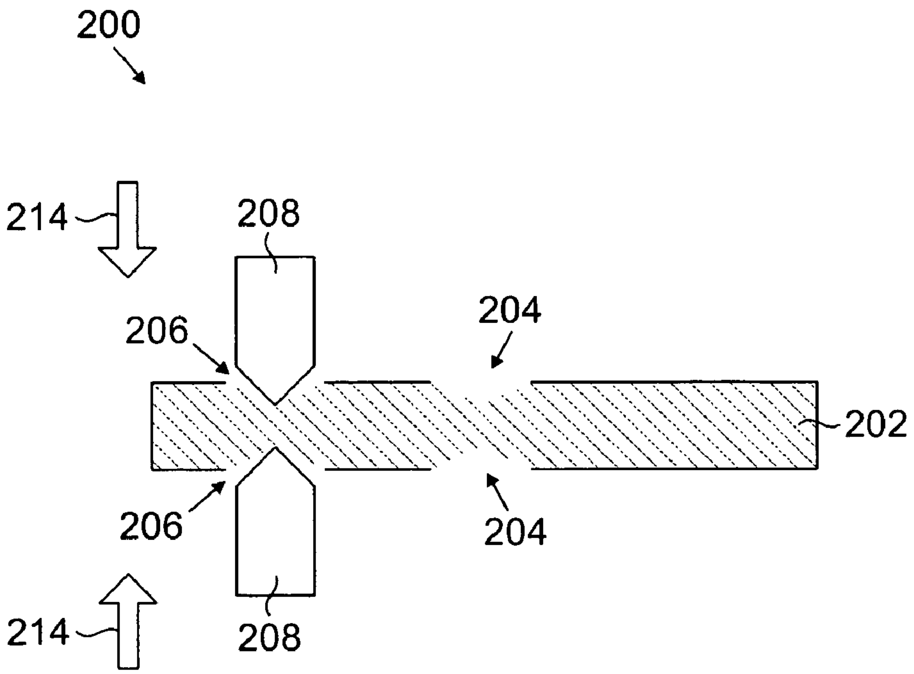

In some initial state, as depicted in FIG. 2*a*, assembly 200 may have elements 208 engaged with features 204, prohibiting member 202 from moving. Elements 208 are in a passive, or non-actuated, state. Referring now to FIG. 2*b*, assembly 200 is to be switched from its initial position to a different position. Elements 208 are actuated 210, disengaging them from features 204. Member 202 is now free to switch. Referring now to FIG. 2*c*, member 202 is actuated 212 laterally from its initial position to a second position where features 206 are generally aligned with members 208. In FIG. 2*d*, members 208 are de-actuated 214 and brought into engagement with features 206, locking member 202 into the second position. Member 202 may then be de-actuated as well, since members 208 confine it to the second position.

Assembly 200 may be produced such that it provides an on-off or double switching as it is moved. Switch contacts (not shown) may be disposed in relation to either end of member 202 such that when in the initial position, the second position, or in both positions, element 202 opens or closes an associated switch. A conductive element (not shown), such as a metallic pad or trace, may therefore be disposed on one or both ends of element 202, to effect the desired single or double switching.

Figure 3A:
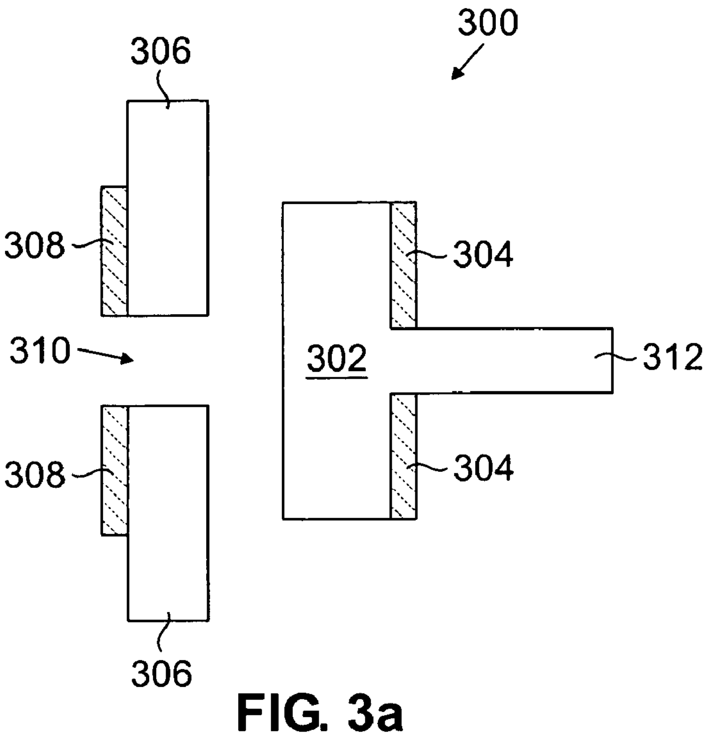
FIGS. 3*a*-3*d* illustrate the operation of another embodiment of a clutch assembly in accordance with the present disclosure.
Figure 3B:
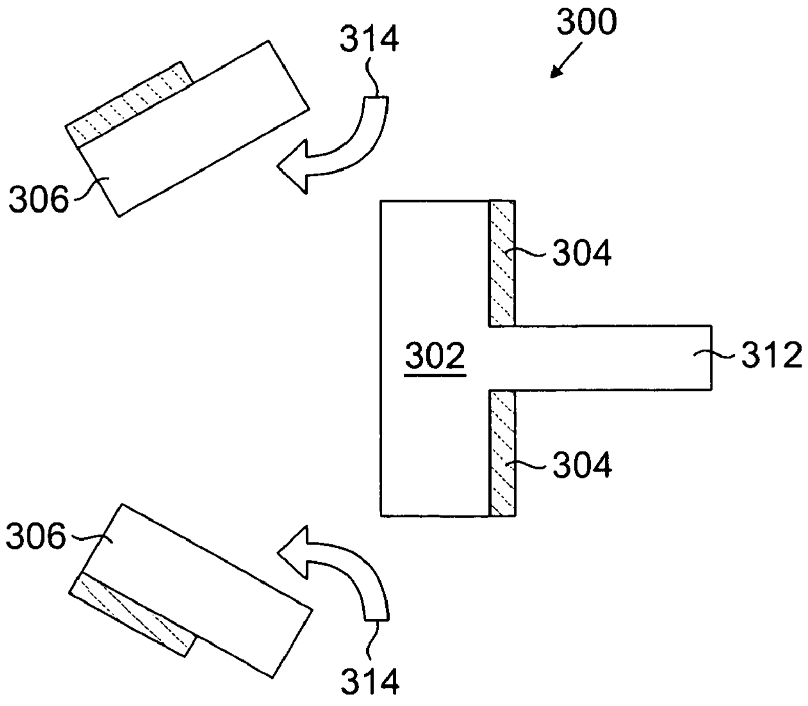

Another embodiment of a clutch assembly in accordance with the present system is now depicted and described in relation to FIGS. 3*a*-3*d*. In FIG. 3*a*, a clutch assembly 300 having a plunger or stopper type architecture is depicted in a top-down view. Assembly 300 comprises a switching element 302 that a plunger or "T" shape. Along the right surface of the upper and lower branches of element 302 are disposed contact elements 304. As depicted in FIGS. 3*a*-3*d*, elements 304 comprise metallic pad or trace type contacts, formed along a surface of member 302. In alternative embodiments, however, elements 304 may comprise any other suitable contact structure or, depending upon the design, there may be only one contact element 304 disposed along member 302.

Assembly 300 also comprises a clutch assembly having gate type engagement elements 306 disposed or formed in proximity to member 302. Elements 306 may be coupled to, formed as part of, or otherwise controlled by any suitable electro-thermal actuating assembly (not shown). Similarly, element 302 may be coupled to, formed as part of, or otherwise controlled by another suitable electro-thermal actuating assembly (not shown). A space or aperture 310 separates elements 306, and has a dimension sufficient to securely accommodate a lateral portion 312 of element 302. Along the left surface of each element 306, near aperture 310, are disposed contact elements 318. Elements 308 also comprise metallic pad or trace type contacts, formed along a surface of elements 306. In alternative embodiments, however, elements 308 may comprise any other suitable contact structure or, depending upon the design, there may be only one contact element 308 disposed along one element 306.

Figure 3C:
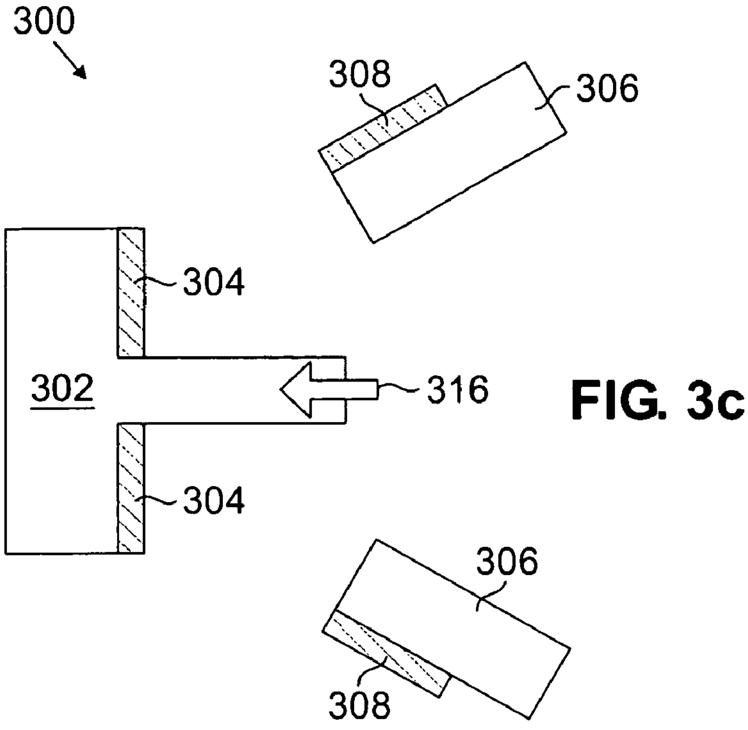
Figure 3D:
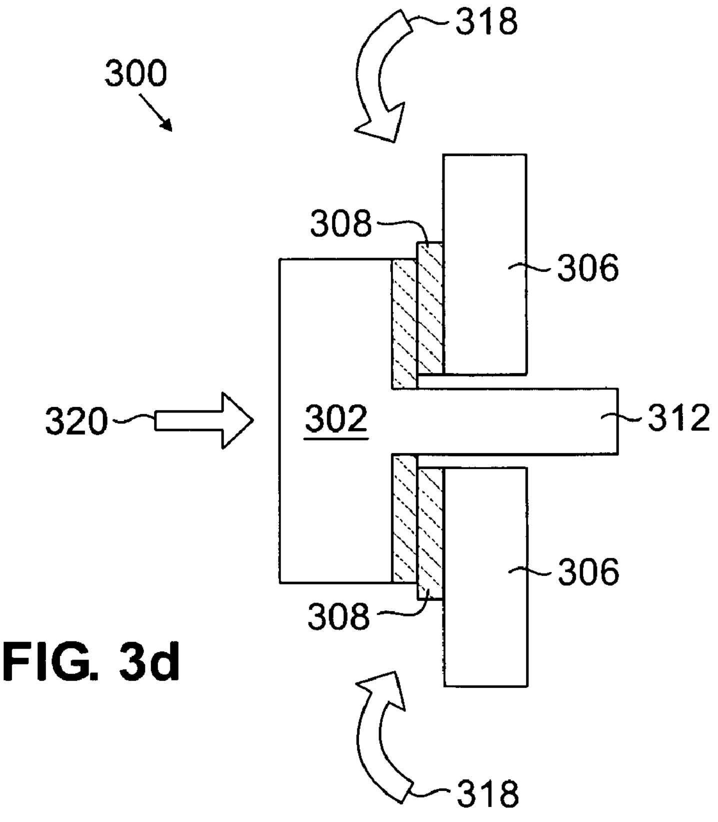

In some initial state, as depicted in FIG. 3*a*, assembly 300 may have elements 306 in a non-actuated position, prohibiting member 302 from lateral movement. Elements 304 are not in contact with elements 308, thus assembly 300 is switched "off." Referring now to FIG. 3*b*, assembly 300 is to be switched from its initial off position to an on position. Elements 308 are actuated 314, opening aperture 310 to a dimension sufficient to allow passage of 302 therethrough. Member 302 is now free to move laterally. Referring now to FIG. 3*c*, member 302 is actuated 316 laterally from its initial position "off" to a second position where elements 304 have cleared aperture 310. In FIG. 3*d*, members 306 are de-actuated 318 and returned to their non-actuated position. Element 302 now protrudes through aperture 310, which is occupied by portion 312. Member 302 may then be de-actuated 320 as well, bringing contacts 304 into engagement with contact 308, and locking member 302 into an "on" position.

In alternative embodiments, the initial position for element 302 may be the same, but alternative provision of elements 308 and 304 may be utilized to render this position an "on" position. One or more contact elements 304 may be provided along the left surface of the upper and lower branches of element 302, while one or more contact elements 308 are disposed along the right surface of each element 306, near aperture 310.

This configuration may be provided in substitution for the configuration depicted in FIGS. 3*a*-3*d*, or in addition to it. In embodiments where there is substitution, alternative defaults for "on" and "off" states may be provided. In embodiments where both configurations are provided, member 302 may be utilized to switch between different circuits or signals—rather that just turn on and off.

Figure 4:
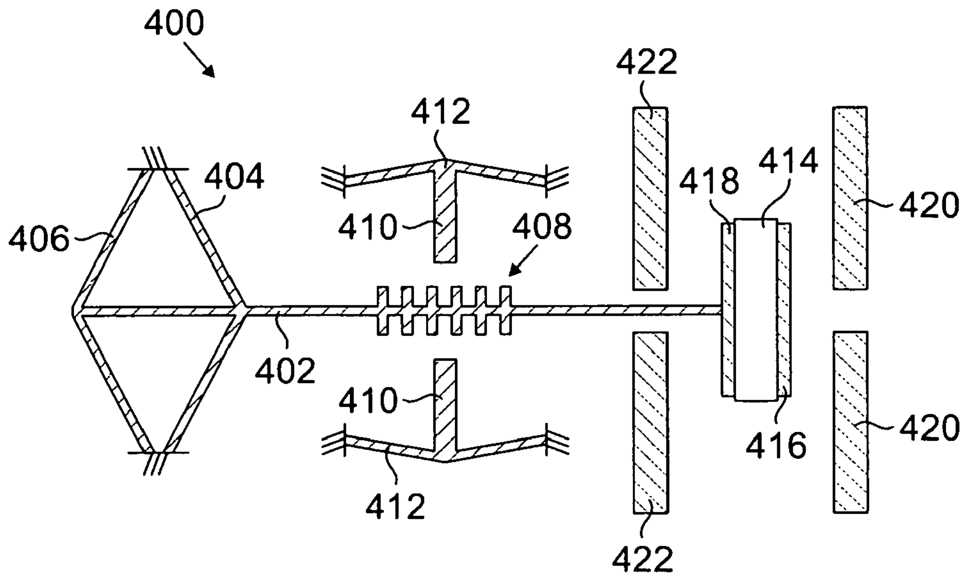
FIG. 4 illustrates one embodiment of a switching assembly in accordance with the present disclosure.

Having now described basic constructs and relationships, certain architectural aspects and embodiments of the system of the present disclosure are now depicted and described. Referring now to FIG. 4, one embodiment of a three-position switching assembly 400 is depicted. Assembly 400 comprises a switching member 402 that is, at one end or portion, operably coupled or connected to first and second actuator assemblies 404 and 406. Assemblies 404 and 406 are disposed in relation to one another and member 402 such that they are operable to either laterally push or pull member 402 over an extended range. Disposed along member 402, a plurality of engagement features 408 are formed and positioned, such that they respectively correspond to three desired switch positions opposing clutch assembly engagement elements 410 are disposed on opposite sides of member 402, proximal to features 408, and each operably coupled or connected to an actuating assembly 412.

At another end or portion of member 402, opposite assemblies 404 and 406, a switching element 414 is disposed. A first contact element 416 is disposed or formed along one surface of element 414. A second contact element 418 is formed along an opposite surface of element 414. Elements 416 and 418 are provided to contact or couple to contact structures 420 and 422, respectively, when member 402 is laterally actuated. Assembly 400 is formed such that, in addition to both of these contact positions for element 414, a third neutral position may be provided that leaves no contact at all between elements 416 and 420 or 418 and 422 (e.g., an "off" position).

In accordance with the description thus far, assembly 412 may be actuated to free member 402 for lateral movement. Member 402 may be laterally actuated in either direction to establish contact between switching member 414 and either contact 420 or 422, or to move member 414 into a neutral, non-contact position. Once member 414 is in a desired position, assembly 412 may be de-actuated to lock member 402 in place.

Figure 5:
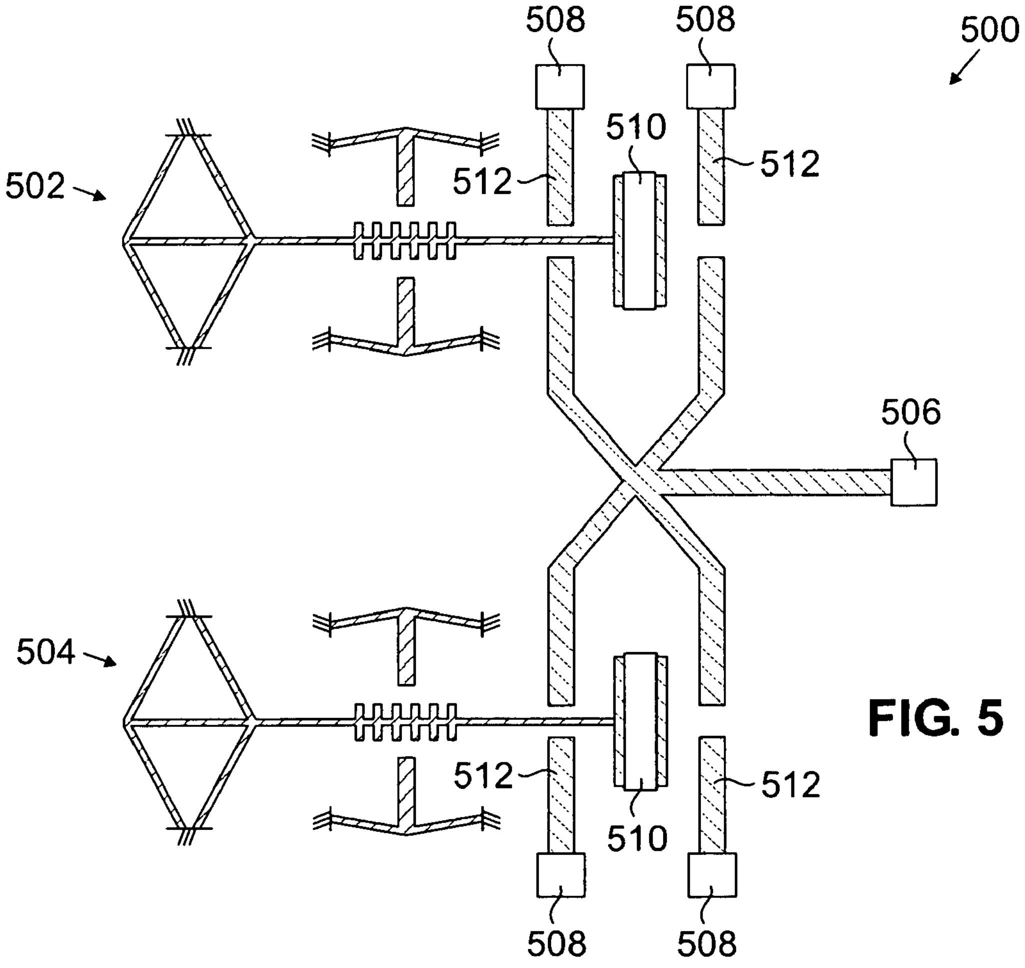
FIG. 5 illustrates one embodiment of a wireless communications switching component in accordance with the present disclosure.

Referring now to FIG. 5, one embodiment of a wireless antenna switching component 500 according to the system of the present disclosure is depicted and described. Component 500 comprises two switching assemblies 502 and 504, similar to assembly 400 in construct and operation. Component 500 comprises an input 506 through which a wireless communication device (not shown) receives and transmits communications signals via one of a plurality of antenna structures 508. If desired, component 500 may be provided in a default "off" or disconnected state—where none of the structures 508 is operably coupled to input 506. Once connection to a specific structure 508 is desired, either assembly 502 or 504 may be actuated to provide contact between a switching element 510 and a contact structure 512 corresponding to the desired structure 508. Component 500 may then be selectively switched from antenna structure to antenna structure, or from a single antenna structure to multiple transceiver circuits, or cycled on and off, as desired—consuming battery power only while switching is being performed.

Figure 6:
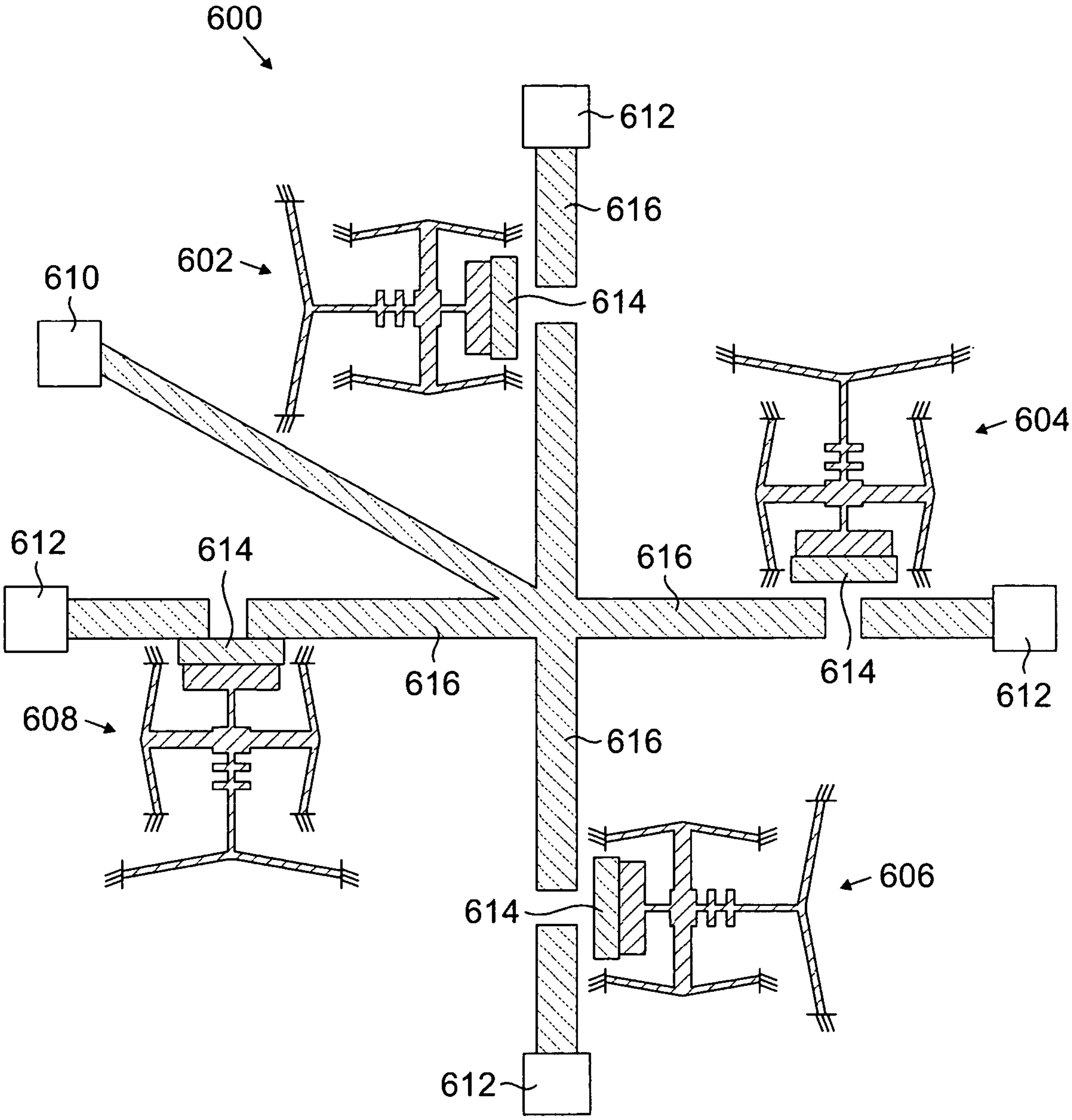
FIG. 6 illustrates another embodiment of a wireless communications switching component in accordance with the present disclosure.

FIG. 6 depicts an alternative embodiment of a wireless antenna switching component 600 according to the system of the present disclosure. Component 600 comprises four switching assemblies 602, 604, 606 and 608. Assemblies 602-608 are in similar to assembly 400 in construct, but operate to provide only two positions each—an actuated "on" position, or a non-contact "off" position. Component 600 comprises an input 610 through which a wireless communication device (not shown) receives and transmits communications signals via one of a plurality of antenna structures 612. If desired, component 600 may be provided in a default "off" or disconnected state—where none of the structures 612 is operably coupled to input 610. Once connection to a specific structure 612 is desired, one of the assemblies 602-608 may be actuated to provide contact between its respective switching element 614 and a contact structure 616 corresponding to the desired structure 612. Component 600 may then be selectively switched from antenna structure to antenna structure, or from a single antenna structure to multiple transceiver circuits, or cycled on and off, as desired—consuming battery power only while switching is being performed.

Figure 7:
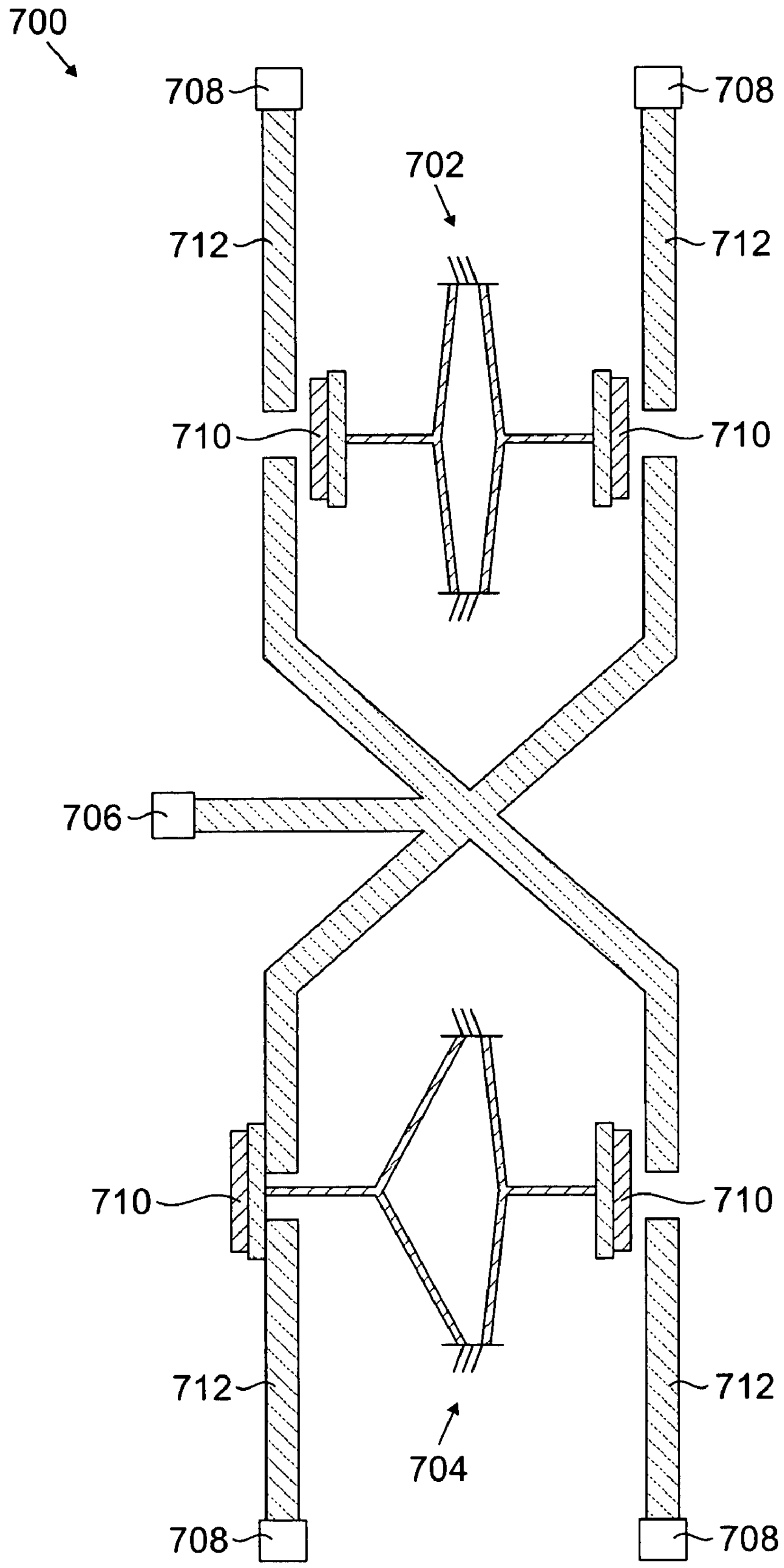
FIG. 7 illustrates another embodiment of a wireless communications switching component in accordance with the present disclosure.

Referring now to FIG. 7, another embodiment of a wireless antenna switching component 700 according to the system of the present disclosure is depicted and described. Component 700 comprises three-position switching assemblies 702 and 704. Assemblies 702 and 704 are each similar, in construct and operation, to a push-pull combination of two opposing instances of assembly 300. Component 700 comprises an input 706 through which a wireless communication device (not shown) receives and transmits communications signals via one of a plurality of antenna structures 708. Alternately, component 700 may be utilized to switch a single antenna structure coupled to input 706 to multiple transceiver circuits. If desired, component 700 may be provided in a default "off" or disconnected state—where none of the structures 708 is operably coupled to input 706. Once connection to a specific structure 708 is desired, either assembly 702 or 704 may be actuated to provide contact between a switching element 710 and a contact structure 712 corresponding to the desired structure 708. Component 700 may then be selectively switched from antenna structure to antenna structure, or from a single antenna structure to multiple transceiver circuits, or cycled on and off, as desired—consuming battery power only while switching is being performed.

It should now be easily appreciated by one of skill in the art that the system of the present disclosure provides and comprehends a wide array of variations and combinations easily adapted to a number of MEMS applications. The relative positions and orientations of contact elements may be provided in any manner suitable for a particular application. For example, contacts may be provided along clutch engagement elements, or may be provided on separate contact structures. Various actuating assemblies may be substituted or combined to provide a particular switching configuration. For example, actuating assemblies other than electro-thermal actuators may be utilized where desired or required. Engagement features and members may be provided in a variety of different or mixed forms to accommodate specific design constraints. All such variations and modifications are hereby comprehended.

It should also be appreciated that the system of the present disclosure may be readily implemented in any desired fabrication processes. The constituent members or components of this system may be produced using any suitable fabrication materials, and formed by any suitable lithography or deposition techniques. This system may also be implemented in MEMS fabrication using non-semiconductor or more conventional mechanical processes.

The embodiments and examples set forth herein are therefore presented to best explain the present invention and its practical application, and to thereby enable those skilled in the art to make and utilize the system of the present disclosure. The description as set forth herein is therefore not intended to be exhaustive or to limit any invention to a precise form disclosed. As stated throughout, many modifications and variations are possible in light of the above teaching without departing from the spirit and scope of the following claims.

What is claimed is:

1. A micro-electromechanical system (MEMS) device comprising:

a switching member;

a first actuator coupled to a first portion of the switching member;

a switching element coupled to a second portion of the switching member, opposite the first actuator;

an engagement feature, disposed along the switching member between the first actuator and the switching element;

a first contact element, disposed along a surface of the switching element;

a clutch assembly, having an engagement element formed in proximity to, and adapted to operably engage with, the engagement feature; and a second contact element, formed in proximity to the first contact element and adapted to form contact therewith when the switching member is actuated or when the switching member is not actuated.

2. The device of claim 1, wherein the MEMS device is a wireless communications device.

3. The device of claim 1, wherein the first actuator is an electro-thermal actuator.

4. The device of claim 1, wherein the engagement feature comprises an indentation formed in the switching member.

5. The device of claim 1, wherein the engagement feature comprises a notch formed in the switching member.

6. The device of claim 1, wherein the engagement feature comprises a protuberance extending outward from a surface of the switching member.

7. The device of claim 1, wherein the engagement feature comprises a tab or tooth extending outward from a surface of the switching member.

8. The device of claim 1, wherein the first contact element is disposed on a surface of the switching element opposite the second contact element.

9. The device of claim 1, wherein the first contact element is disposed on a surface of the switching element closest to the second contact element.

10. The device of claim 1, wherein the second contact element is disposed on a surface closest to the switching element.

11. The device of claim 1, wherein the second contact element is disposed on a surface opposite the switching element.

12. The device of claim 1, wherein the engagement element comprises a bearing.

13. The device of claim 1, wherein the engagement element comprises a tooth.

14. The device of claim 1, wherein the clutch assembly further comprises an electro-thermal actuator operably coupled to the engagement element.

15. A method of lockably switching a MEMS switch device, comprising the steps of:

providing a switching member having a plurality of engagement features disposed along a surface thereof;

providing a first actuator coupled to a first portion of the switching member;

providing a clutch assembly, having an engagement element formed in proximity to, and adapted to operably engage with, the engagement features, and having a second actuator adapted to engage or disengage the engagement element from the engagement features;

actuating the second actuator to disengage the engagement element from a first engagement feature;

actuating the first actuator to move the switching element relative to the engagement element; and de-actuating the second actuator to engage the engagement element with a second engagement feature.

16. The method of claim 15, wherein the MEMS switch device is a wireless communications antenna switching device.

17. The method of 15, wherein the first actuator is an electro-thermal actuator.

18. The method of 15, wherein the second actuator is an electro-thermal actuator.

19. The method of claim 15, wherein the engagement features comprise indentations formed in the switching member.

20. The method of claim 15, wherein the engagement features comprise notches formed in the switching member.

* * * * *